United States Patent Office 3,829,519
Patented Aug. 13, 1974

3,829,519
PRODUCTION OF BENZENE
Roy John Sampson and Christopher Buxton Spencer, Stockton-on-Tees, England, assignors to Imperial Chemical Industries Limited, London, England
No Drawing. Filed Jan. 5, 1971, Ser. No. 104,162
Claims priority, application Great Britain, Jan. 9, 1970, 1,138/70; July 27, 1970, 36,197/70; Nov. 18, 1970, 54,866/70
Int. Cl. C07c 3/58
U.S. Cl. 260—672 R
9 Claims

ABSTRACT OF THE DISCLOSURE

Alkyl aromatic hydrocarbons, for example toluene, are dealkylated to yield benzene and hydrogen in the presence of steam and, optionally, hydrogen over a supported Group VIII noble metal catalyst. The products of the reaction are phase separated to yield an organic fraction from which benzene is separated, the remainder of the fraction comprising unchanged and/or other aromatic hydrocarbons being recycled as feed material for continued dealkylation. The process may be used to increase the aromatics content and to increase the ratio of lower to higher aromatics in paraffin-aromatics mixtures, for example the hydrocarbon mixture obtained by reforming.

---

This invention relates to the conversion of alkyl benzenes to benzene and hydrogen.

Amongst the various aromatic hydrocarbons which are derived from hydrocarbon conversion processes, the most important are benzene, ethyl benzene and the xylenes. Toluene and the $C_9$ aromatic hydrocarbons which are unavoidably co-produced in large tonnages do not enjoy high marketability as chemical substances and the latter for the greater part must even be counted as fuel oils. It has, however, been demonstrated that alkyl aromatic hydrocarbons may be converted to benzene by catalytic dealkylation in the presence either of hydrogen or of steam, the latter using a supported nickel catalyst. Hydrodealkylation of aromatic hydrocarbons other than toluene is not generally commercially viable.

We have found that an improved continuous process for dealkylating alkyl benzenes such as toluene and $C_9$ aromatic hydrocarbons consists in passing one or more alkyl benzenes, together with steam preferably in substantial molar excess, in the vapour phase over a solid dealkylation catalyst that contains an active metal component consisting of at least one supported Group VIII noble metal and a support component consisting essentially of alumina, effecting a phase separation upon the reaction products whereby to isolate an organic fraction containing benzene and unchanged and/or other aromatic hydrocarbons, separating benzene from the organic fraction and recycling such unchanged and/or other aromatic hydrocarbons as feed material for continued dealkylation.

The catalyst support consists essentially of alumina, for example gamma-alumina, but it may be other forms of alumina or alumina-containing material such as zeolite or a spinel or an amorphous support such as silica alumina. The presence of silica is, however, considered undesirable although it may perhaps be readily tolerated in small proportion possibly even up to about 5% by weight of the support. A small proportion of alkaline material may be present in order to reduce the intrinsic acidity of the support. Alkali metal and alkaline earth metal oxides are preferred alkalising materials. The presence of minor proportions of other oxidic species may in practice be unavoidable. The catalysts used in the dealkylation process may be a commercially obtainable aromatising catalyst consisting of platinum supported on activated alumina. Catalysts consisting of iridium supported on alumina are considered particularly important.

Outstanding amongst the Group VIII noble metals are iridium and platinum, each of which combines sufficiently great activity for attractiveness in commercial operation with very high selectivity for benzene production. Palladium, rhodium and ruthenium for example, demonstrate lower selectvities than platinum and iridium, but, even so, they compare favourably, on balance, with nickel which we have found is poorly selective. The content of noble metal impregnated on the catalyst is suitably from 0.1 to 1% by weight, for example 0.4 to 0.8% by weight, but contents above and below this range may be used if desired. Catalyst regeneration may be accomplished in known manner using an atmosphere of hydrogen, steam, oxygen or oxygen-containing gas such as air.

Co-products of the dealkylation reaction are mainly hydrogen, carbon dioxide and carbon monoxide. These substances are also formed by a competing reaction which occurs simultaneously and leads to loss of selectivity to benzene, namely, steam reforming of the aromatic hydrocarbons. Control, for example by variation of temperature and/or pressure, should therefore be exercised over the reaction conditions in order to maximise the yield of product benzene. We have found also that, in mixtures in which aliphatic hydrocarbons are present with the aromatic hydrocarbons, the aliphatic hydrocarbons react in preference to benzene. Thus the process may be used to increase the aromatics content and to increase the ratio of lower to higher aromatics in paraffin-aromatics mixtures, for example the hydrocarbon mixture obtained by reforming. The paraffins in the mixture are converted to hydrogen and carbon oxides.

However, although hydrogen is formed during the process of the invention and is thus present over some parts of the catalyst bed during the process, we have found that catalyst life is significantly lengthened if provision is made for hydrogen to be present over the whole bed by continuously feeding hydrogen as well as steam and aromatic hydrocarbons to the process.

It will be appreciated that when the process is operated without hydrogen being fed there is some catalyst deactivation. This deactivation occurs especially in the bed close to the feed inlet where the partial pressure of hydrogen formed by the reactions occurring in the process is relatively lower than in other parts of the bed.

By feeding hydrogen with the reactant stream the deactivation, which occurs in the absence of hydrogen, is substantially reduced or eliminated especially in the bed close to the feed inlet. Moreover, not only is the loss of catalyst activity reduced, we find that the process of the present invention also enhances the catalyst activity so far as the rate of dealkylation is concerned.

We prefer that the amount of hydrogen fed to the process should be in the range 5 to 50 moles percent based on total feed (that is hydrocarbon+steam) more preferably 5 to 20 moles percent.

The hydrogen may be supplied from an external supply but it is preferred to use a recycle of hydrogen formed in the process of the invention.

The process admits of wide variation in the relative proportions of steam and feed aromatic hydrocarbons. A minimum practical molar ratio of steam to aromatic hydrocarbon is probably around the stoichiometric requirement, but higher molar ratios are both desirable and conveniently arranged. Very satisfactory are molar ratios of from 12:1 to 40:1, for example 15:1 to 35:1.

The dealkylation reaction is endothermic and the reactants are desirably preheated to a temperature at least approaching reaction temperature. The reaction temperatures may very suitably be maintained within the range of from 400° to 800° C. The use of lower or higher temperatures is feasible but the preferred operating range of temperature is 500° to 650° C.

The reaction proceeds at any practical pressure but for reasons of operating convenience it is preferred to use above atmospheric pressure. Good performance has been achieved at pressures only marginally above atmospheric (that is to say, at a minimum pressure necessary to achieve an adequate flow of vapour through the reactor system) and also in operations at higher pressures. Very likely, optimum pressures for commercial production will be found to lie within the range of from 5 to 50 atmospheres gauge, more preferably 25 to 50 atmospheres. The use of such moderate pressures is attended by the advantage that handling and processing of the gaseous products of the reaction is facilitated, additional means for gas compression being unnecessary.

Weight hourly space velocities (W.H.S.V.) for the feed aromatic hydrocarbon(s) and the steam are suitably within the range 0.2 to 10, preferably 0.2 to 2, and 1 to 30, preferably 1 to 10 respectively.

Carbon dioxide is readily separated from the effluent gas phase by known processes, e.g. processes based upon the formation and decomposition of potassium bicarbonate. If carbon monoxide removal is also desired, this may be achieved in known manner by, say, a water-gas shift process (followed, if desired and depending upon the desired hydrogen purity, by a methanation step).

Alternatively carbon dioxide may be converted to carbon monoxide by a reverse-shift reaction resulting in a mixture of carbon monoxide and hydrogen which is useful in other processes, for example the OXO process.

Phase separation of the condensable portion of the effluent from the dealkylation reaction is likewise readily accomplished in known manner. The topstream of aromatic hydrocarbons withdrawn from the phase separation stage may be split (after appropriate drying) by distillation into a product benzene stream and a recycled alkyl aromatic(s) stream. This distillation may be effected in a column that is separate from distillation facilities forming part of any integrated or adjoining plant for aromatic hydrocarbon production or may be effected by such facilities.

The following Examples illustrate the process of the invention.

EXAMPLE 1

Toluene and water were pumped continuously through a vaporiser (exit temperature 300° C.) and thence by downward flow through a silica tube containing as catalyst platinum (0.8% by weight) on gamma-alumina and maintained at a temperature of 560° C. and at slightly superatmospheric pressure. The catalyst was a commercial reforming catalyst. The toluene weight hourly space velocity was 0.468 and that of the water 1.60. The mole ratio of steam to toluene was thus 17:1. Samples of the liquid product and the non-condensable gases were analysed by GLC. After steady conditions had been obtained, a 12 hour run was carried out during which 92% of the toluene was converted, the yield of benzene based on toluene converted being 78% (mole). The non-condensable gases were mainly hydrogen and carbon dioxide (with less than 1% methane and carbon monoxide) in proportions agreeing with the quantity of benzene formed assuming the reactions which occurred were the following:

$$C_7H_8 + 2H_2O \rightarrow C_6H_6 + CO_2 + 3H_2$$

$$C_7H_8 + 14H_2O \rightarrow 7CO_2 + 18H_2$$

The gaseous effluent was found to be suitable for treatment by a water gas shift process to reduce its CO content to a low value and to increase further its hydrogen content and by caustic scrubbing to recover $CO_2$. Likewise the non-benzene component of the effluent aromatic hydrocarbon fraction was suitable for recycling as feed to the dealkylation reaction.

EXAMPLE 2

Toluene and water were pumped continuously through a vaporiser (exit temperature 300° C.) and thence by downward flow through a silica tube containing as catalyst ruthenium (0.6% by weight) on gamma-alumina and maintained at a temperature of 510° C. and at slightly superatmospheric pressure. The toluene WHSV was 0.492 and that of the water 1.74, corresponding to a mole ratio of steam to toluene of 18:1. During a 72 hour run, the conversion was constant at 56%, the yield of benzene based on toluene converted being 50%. The non-condensable gases were mainly hydrogen (70%) and carbon dioxide (24%) together with small proportions of methane (4%) and carbon monoxide (2%).

EXAMPLE 3

The same system was used to test a rhodium catalyst containing 0.3% by weight rhodium and 0.5% by weight calcium oxide, on alpha-alumina. The weight hourly space velocities were: toluene 0.430 and water 1.45. The temperature of the catalyst bed was 425° C. An initial toluene conversion of 64% was obtained, the yield of benzene being 28% (mole). The conversion then fell at a rate of about 10% per hour, after four hours the toluene conversion being 26% and the yield of benzene 44% (mole). The gaseous and condensable products were suitable for subsequent work-up and treatment as described in Example 1.

EXAMPLE 4

Using a catalyst containing 2% by weight palladium on gamma-alumina, a reaction temperature of 650° C. and weight hourly space velocities of toluene and water of 0.434 and 1.30 respectively, an initial yield of benzene of 28% (mole) was obtained at 30% toluene conversion. During the first 3 hours of the run, the conversion increased from 30% to 39%, and then continued at this level for the remaining 2 hours of the run. During this steady period when the toluene conversion was 39%, the yield of benzene was 23% (mole). The product could be subsequently worked-up and treated as aforedescribed in Example 1.

EXAMPLE 5

Toluene and water vapours were pumped at weight hourly space velocities of 0.636 and 4.28 respectively (a steam to toluene mole ratio of 34.1) and at a pressure of 450 p.s.i.g. to a stainless steel tube containing the same catalyst as in Example 1, maintained at 600° C. During the 24 hour period after steady conditions had been obtained the average toluene conversion was 68%, the yield of benzene being 74% (mole).

EXAMPLE 6

Toluene and water were pumped continuously through a vaporiser (exit temperature 300° C.) and thence by downward flow through a silica tube containing a catalyst consisting of iridium (0.5% by weight) on gamma-alumina and maintained at a temperature of 530° C. and at a pressure slightly greater than atmospheric. The weight hourly space velocities were 0.547 for toluene and 2.04 for water and the mole ratio of steam to toluene was 19:1. Samples of the liquid product and non-condensable gas product were analysed by gas-liquid chromatography. During the first 48 hours of the run, the toluene conversion was constant at 95%, the yield of benzene based on toluene converted being 84 mole percent. The non-condensable gases were mainly hydrogen (70 mole percent) and carbon dioxide (20 mole percent) together with small amounts of methane (8 mole percent) and carbon monoxide (2 mole percent).

EXAMPLE 7

Water and a mixture of 13% by weight of 3-methylhexane, 13% by weight of n-octane and 74% by weight of toluene were charged continuously through a vaporiser and thence by downward flow through a silica tube containing the same iridium catalyst as in Example 6. The weight hourly space velocities were water 1.90, hydrocarbon 0.570 (mole ratio of steam to hydrocarbon, 18:1). At slightly superatmospheric pressure and at a temperature of 530° C. the product contained only 8% by weight of 3-methylhexane and 3% by weight of n-octane. Assuming that all the benzene present was derived from toluene, of the 56% toluene converted, 90% (mole) was converted to benzene. The non-condensable gas was mainly hydrogen (70%) and carbon dioxide (20%) together with small amounts of methane (7%) and carbon monoxide (3%).

EXAMPLE 8

Following the procedure of Example 1, toluene was charged at a weight hourly space velocity of 0.470 and water at a weight hourly space velocity of 1.66 (mole ratio of steam to toluene, 18:1). The catalyst consisted of platinum impregnated to a loading of 0.77% by weight on ICI Agricultural Division's 12–1 gamma-alumina.

The temperature of the catalyst bed was 520° C. During the 24 hour period after steady conditions had been obtained, the average toluene conversion was 85%, the yield of benzene being 93% (mole). The non-condensable product consisted of hydrogen (72%), carbon dioxide (22%), methane (5%) and carbon monoxide (1%).

EXAMPLE 9

Following the procedure of Example 1, toluene was charged at a weight hourly space velocity of 0.692 and water at a weight hourly space velocity of 2.40 (mole ratio of steam:toluene, 18:1). The catalyst consisted of platinum impregnated to a loading of 0.5% by weight on ICI Agricultural Division's 12–1 alumina crushed to a B.S.S. mesh size of 6 to 10. The temperature of the catalyst bed was 600° C and the total pressure was 450 p.s.i.g. The initial toluene conversion was 78% and the yield of benzene was 90% based on toluene converted.

The non-condensable product consisted of hydrogen, carbon monoxide, carbon dioxide and methane.

EXAMPLE 10

Two runs were made in which toluene was dealkylated. Hydrogen was added in the second run but not in the first. In the first run, toluene and water were charged to a stainless steel tube containing platinum (0.8% by weight) on gamma-alumina as catalyst and maintained at a temperature of 640° C. and at a pressure of 450 p.s.i.g. The toluene weight hourly space velocity was 1.20 and that of the water was 4.16. The mole ratio of steam to toluene was 18:1.

Once steady conditions had obtained, the initial toluene conversion was 92% and the yield of benzene based on toluene converted was 71 mole percent. During a 100 hour period the conversion of toluene fell to 25%.

In the second run toluene and water at the same weight hourly spaced velocities as in the first run and hydrogen at a rate of 23 moles hydrogen/litre catalyst/hour were charged to a stainless steel tube containing the same catalyst as in the first run The total pressure was 400 p.s.i.g., the inlet partial pressure of water, toluene and hydrogen being, respectively, 322, 18 and 60 p.s.i.g. The catalyst temperature was held at 590° C.

Initially, once steady conditions were obtained, all the toluene was converted and the yield of benzene was 60 mole percent. After 100 hours of operation, conversion of toluene had fallen only to 90%.

Hydrogen, carbon monoxide, carbon dioxide, and methane were also produced as well as benzene.

In comparison with the first run, it can be seen that although the temperature in the second run was lower and the contact timer shorter, the toluene conversion was higher and its rate of fall-off and hence the rate of deactivation of the catalyst, lower.

EXAMPLE 11

Two runs were made in which toluene was dealkylated. Hydrogen was added in the first run but not in the second in which nitrogen was added. In the first run toluene and water were charged to a stainless steel tube containing platinum (0.8% by weight) on gamma-alumina as catalyst and maintained at a temperature of 580° C. and at a total pressure of 400 p.s.i.g The toluene weight hourly space velocity was 1.20 and that of the water was 4.16. The mole ratio of steam: toluene was 18:1.

Hydrogen was charged at a rate of 28 moles of hydrogen/litre catalyst/hour. The inlet partial pressures were 312 p.s.i.g. for water, 27 p.s.i.g. for toluene and 70 p.s.i g. for hydrogen.

Once steady conditions had been obtained, the initial toluene conversion was 97% and the yield of benzene based on toluene converted was 70 mole percent. After 5 days of operation, the conversion had fallen to 57%. This represented a decay, which was substantially uniform, in the conversion of 8% per day.

In the second run toluene and water at the same weight hourly space velocities as in the first run and nitrogen were charged to a stainless steel tube containing the same catalyst as in the first run. The temperature and total pressure were the same as in the first run as were the inlet partial pressures except that the inlet partial pressure for nitrogen was 70 p.s.i.g.

Once steady conditions had been obtained, the initial toluene conversion was only 47%, the yield of benzene being again 70 mole percent. The conversion then decayed at a rate of 14% per day during operation over a period of two days. Hydrogen, carbon monoxide, carbon dioxide, and methane were also produced as well as benzene.

It can be seen that the presence of hydrogen in the first run resulted in both a higher toluene conversion and a lower rate of reactivation of the catalyst.

What we claim is:

1. A continuous process for steam dealkylating alkyl benzene which comprises simultaneously feeding a mixture consisting essentially of one or more alkyl benzenes, together with steam and hydrogen, wherein the amount of hydrogen in the mixture is in the range of 5 to 20 moles percent based on total feed of hydrocarbon and steam, in the vapor phase into a dealkylation zone containing a solid dealkylation catalyst which consist essentially of an active metal component consisting of at least one Group VIII noble metal on a support consisting essentially of alumina to produce benzene directly feeding the reaction products to a phase separation whereby to isolate an organic fraction containing benzene and unreacted alkyl benzenes, other aromatic hydrocarbons formed in the process, or both, separating benzene from the organic fraction and recycling such unreacted alkyl benzenes, other aromatic hydrocarbons formed in the process or both as feed material for continued dealkylation.

2. A process as claimed in claim 1 in which the catalyst support is gamma-alumina.

3. A process as claimed in claim 1 in which the Group VIII noble metal is platinum, iridium, palladium, rhodium or ruthenium.

4. A process as claimed in claim 3 in which the content of noble metal impregnated on the catalyst is 0.1 to 1% by weight.

5. A process as claimed in claim 1 in which the molar ratio of steam to aromatic hydrocarbon is in the range 12:1 to 40:1.

6. A process as claimed in claim 1 in which the reaction temperature is in the range 400 to 800° C. and the reaction pressure is in the range 5 to 50 atmospheres gauge.

7. A process as claimed in claim 1 in which aliphatic hydrocarbons are present in the alkyl benzene stream.

8. A process as claimed in claim 1 which comprises passing toluene together with steam and hydrogen in the vapor phase over a solid dealkylation catalyst selected from platinum on alumina and iridium on alumina, the molar ratio of steam to toluene lying in the range 12:1 to 40:1 and the amount of hydrogen fed to the process lying in the range 5 to 20 moles percent based on the total feed (toluene+steam), effecting a phase separation upon the reaction products whereby to isolate an organic fraction containing benzene and toluene, separating benzene from the organic fraction and recycling such unchanged toluene as feed material for continued dealkylation.

9. A continuous process for steam dealkylating alkyl benzenes which comprises passing a feed comprising one or more alkyl benzenes and an aliphatic hydrocarbon, together with steam, in the vapor phase into a dealkylating zone containing a solid dealkylation catalyst which consist essentially of an active metal component consisting of at least one Group VIII noble metal on a support consisting essentially of alumina to produce benzene, directly feeding the reaction products to a phase separation whereby to isolate an organic fraction containing benzene and unreacted alkyl benzenes, other aromatic hydrocarbons formed in the process, or both, separating benzene from the organic fraction and recycling such unreacted alkyl benzenes, other aromatic hydrocarbons formed in the process or both as feed material for continued dealkylation.

References Cited
UNITED STATES PATENTS

| | | | |
|---|---|---|---|
| 3,530,194 | 9/1970 | Quik et al. | 260—672 R |
| 3,595,932 | 7/1971 | Maslyansky et al. | 260—672 R |
| 3,306,944 | 2/1967 | Pollitzer et al. | 260—672 R |
| 2,734,929 | 2/1956 | Doumani | 260—672 R |
| 3,436,433 | 4/1969 | Lester | 260—672 R |
| 3,436,434 | 4/1969 | Lester | 260—672 R |
| 3,291,850 | 12/1966 | Carson | 260—672 R |
| 3,485,883 | 12/1969 | Engelbrecht et al | 260—672 R |

CURTIS R. DAVIS, Primary Examiner